United States Patent
Imi et al.

(10) Patent No.: US 12,026,443 B2
(45) Date of Patent: *Jul. 2, 2024

(54) RECORDING MEDIUM, COMPUTING METHOD, AND COMPUTING DEVICE

(71) Applicants: Kabushiki Kaisha Toshiba, Tokyo (JP); Toshiba Electronic Devices & Storage Corporation, Tokyo (JP)

(72) Inventors: Hitoshi Imi, Yokohama Kanagawa (JP); Motochika Okano, Tokyo (JP); Yoshinori Fukuba, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 862 days.

This patent is subject to a terminal disclaimer.

(21) Appl. No.: 17/017,785

(22) Filed: Sep. 11, 2020

(65) Prior Publication Data
US 2021/0294952 A1    Sep. 23, 2021

(30) Foreign Application Priority Data
Mar. 23, 2020  (JP) .................. 2020-051691

(51) Int. Cl.
*G06F 30/3308* (2020.01)
*G06F 30/392* (2020.01)
(Continued)

(52) U.S. Cl.
CPC ........ *G06F 30/3308* (2020.01); *G06F 30/392* (2020.01); *G06F 2119/08* (2020.01); *G06F 2119/10* (2020.01)

(58) Field of Classification Search
CPC ............... G06F 30/3308; G06F 30/392; G06F 2119/08; G06F 2119/10; G06F 30/367;
(Continued)

(56) References Cited

U.S. PATENT DOCUMENTS

| 7,398,497 B2 * | 7/2008 | Sato ............... G06F 30/367 716/112 |
| 7,962,320 B2 | 6/2011 | Ogawa et al. |

(Continued)

FOREIGN PATENT DOCUMENTS

| JP | 2005-267191 A | 9/2005 |
| JP | 2010-134775 A | 6/2010 |

(Continued)

*Primary Examiner* — Eunhee Kim
(74) *Attorney, Agent, or Firm* — Maier & Maier, PLLC

(57) ABSTRACT

A non-transitory computer readable recording medium includes simulation data input into a computing device executing a simulation of a semiconductor device, wherein the simulation data includes part shape information describing shape and terminal information of the semiconductor device, logical model information describing operation and connection information of an element in the semiconductor device, and functional block information describing positional information of a functional block in the semiconductor device, and the computing device causes the part shape information, the logical model information, and the functional block information to correspond to each other to execute the simulation of the semiconductor device.

18 Claims, 7 Drawing Sheets

(51) Int. Cl.
*G06F 119/08* (2020.01)
*G06F 119/10* (2020.01)

(58) Field of Classification Search
CPC ........ G06F 30/398; G06F 30/32; G06F 30/36; G06F 30/38; G06F 30/3947
See application file for complete search history.

(56) References Cited

U.S. PATENT DOCUMENTS

| | | | |
|---|---|---|---|
| 8,504,977 B1* | 8/2013 | Yen | G06F 30/394 |
| | | | 716/110 |
| 2003/0226129 A1* | 12/2003 | Nakagawa | G06F 30/392 |
| | | | 716/124 |
| 2012/0210283 A1* | 8/2012 | Li | G06F 30/398 |
| | | | 716/112 |

FOREIGN PATENT DOCUMENTS

| | | |
|---|---|---|
| JP | 2017-10248 A | 1/2017 |
| WO | 2006-121042 A1 | 11/2006 |

* cited by examiner

FIG. 4

I1: PART SHAPE INFORMATION

Ln1:
```
<shape>
  <polygon points = 100,100,400,100,400,400 100,400>
</shape>
```

Ln2:
```
<socket name = LSI1>
<port id="1" x="150" y="450" name="OUT" >
<port id="2" x="150" y="450" name="IN1" >
<port id="3" x="350" y="450" name="IN2" >
<port id="4" x="150" y="450" name="IN3" >
<port id="5" x="150" y="450" name="IN4" >
</socket>
```

I2: LOGICAL MODEL INFORMATION

Ln3:
```
<reference format="VHDL" refile="LOGIC.vhd">
  <connection port_id="2" socket_name="LSI1">
    <vhdl:ref_port portid="IN1" subckt="LOGIC">
  <connection port_id="3" socket_name="LSI1">
    <vhdl:ref_port portid="IN2" subckt="LOGIC">
  <connection port_id="4" socket_name="LSI1">
    <vhdl:ref_port portid="IN3" subckt="LOGIC">
          .
          .
          .
```

I3: FUNCTIONAL BLOCK INFORMATION

Ln4:
```
<shape>
  <polygon points = 100,100,400,100,400,400 100,400>
  <polygon points = 100,450,200,450,200,500 100,500>
</shape>
```

Ln5:
```
<Function name = LOGIC>
<ckt id="1" x="150" y="450" name="AND" >
< ckt id="2" x="180" y="350" name="OR" >
</Function >
```

I4: CORRESPONDENCE INFORMATION

Ln6:
```
<reference format="VHDL" refile="LOGIC.vhd">
  <connection ckt_id="1" Function_name="LOGIC">
    <vhdl:ref_ckt id="AND" subckt="LOGIC">
  <connection ckt_id="2" Function_name="LOGIC">
    <vhdl:ref_ckt id="OR" subckt="LOGIC">
</ reference >
```

RECORDING MEDIUM, COMPUTING METHOD, AND COMPUTING DEVICE

CROSS REFERENCE TO RELATED APPLICATIONS

This application is based upon and claims the benefit of priority from the prior Japanese Patent Application No. 2020-51691, filed on Mar. 23, 2020, the entire contents of which are incorporated herein by reference.

FIELD

One embodiment of the present invention relates to a recording medium, a computing method, and a computing device.

BACKGROUND

In examination of physical characteristics such as heat generation and electro magnetic interference (EMI) in a semiconductor device such as a large scale integrated circuit (LSI), a simulation is performed by setting a specific excitation source and power source in a physical circuit block in the semiconductor device.

However, the physical characteristics obtained in the examination with use of the fixed excitation source and power source differ from the physical characteristics generated during actual operation of the semiconductor device, and an accurate examination cannot be performed.

BRIEF DESCRIPTION OF THE DRAWINGS

FIG. 4 illustrates a specific example of the simulation data, which is the content of the integrated file corresponding to FIG. 3.

DETAILED DESCRIPTION

According to one embodiment, a non-transitory computer readable recording medium includes simulation data input into a computing device executing a simulation of a semiconductor device, wherein the simulation data includes part shape information describing shape and terminal information of the semiconductor device, logical model information describing operation and connection information of an element in the semiconductor device, and functional block information describing positional information of a functional block in the semiconductor device, and the computing device causes the part shape information, the logical model information, and the functional block information to correspond to each other to execute the simulation of the semiconductor device.

An embodiment of a recording medium, a computing method, and a computing device will be described below with reference to the drawings. Hereinbelow, main components of a recording medium, a computing method, and a computing device will mainly be described, and the recording medium, the computing method, and the computing device may have components and functions that are not illustrated or described. The following description does not exclude the components and the functions that are not illustrated or described.

Figure 1:
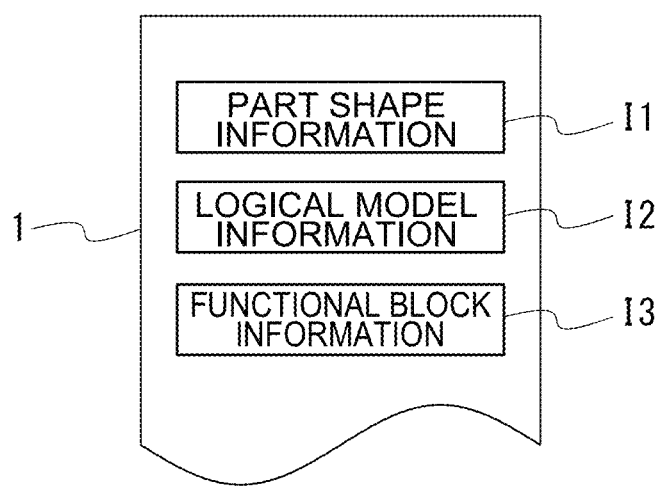
FIG. 1 illustrates simulation data according to an embodiment.

FIG. 1 illustrates simulation data 1 according to an embodiment. The simulation data 1 in FIG. 1 includes part shape information I1, logical model information I2, and functional block information I3. The simulation data 1 in FIG. 1 can be recorded on a recording medium. The type of the recording medium is not particularly limited. For example, the recording medium may be a semiconductor memory, a magnetic recording device, an optical disk, or a magneto-optical disk.

The part shape information I1 is information describing shape and terminal information of a semiconductor device. Some semiconductor devices perform a digital operation while others perform an analog operation, but the present embodiment can be applied to semiconductor devices performing any operation. Here, the shape information is information indicating an outer shape of the semiconductor device, such as a size of the semiconductor device and positional information of the corners. The terminal information is information about terminal names and terminal positions of an input terminal and an output terminal included in the semiconductor device.

Figure 2A:
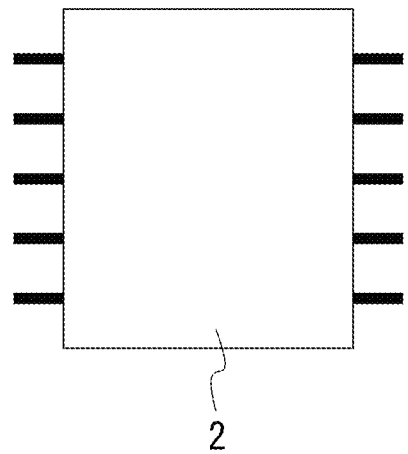
FIG. 2A is a plan view illustrating an example of a semiconductor device.

FIG. 2A is a plan view illustrating an example of a semiconductor device 2, which is a part. FIG. 2A illustrates an example of a dual in-line package (DIP) type semiconductor device 2, and the package type of the semiconductor device 2 does not matter. The semiconductor device 2 according to the present embodiment can be applied to any package type such as a single in-line package (SIP), a pin grid array (PGA), a small outline package (SOP), and a ball grid array (BGA).

The logical model information I2 in FIG. 1 is information describing operation and connection information of elements in the semiconductor device 2. The elements may be arbitrary elements in the semiconductor device 2. Here, the operation information is information describing what kind of operation the semiconductor device 2 performs. The connection information is information indicating a connection relationship between a certain element and another element. In a more specific example, the connection information is information indicating to which terminal of another element each terminal of a certain element is connected and to which input terminal or output terminal in the semiconductor device 2 each terminal of a certain element is connected.

Figure 2B:
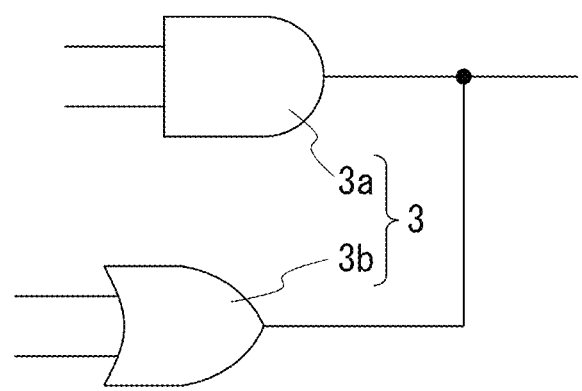
FIG. 2B illustrates an example of an element in the semiconductor device.

FIG. 2B illustrates an example of an element 3 in the semiconductor device 2. The element 3 includes an element 3 that is not connected to the output terminal of the semiconductor device 2 and an element 3 that is connected to the output terminal. In the present specification, an example in which these elements 3 are not distinguished from each other will be described, but these elements 3 may be distinguished.

Figure 2C:
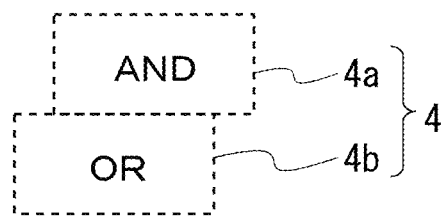
FIG. 2C illustrates an example of a functional block 4.

The functional block information I3 in FIG. 1 is information describing at least positional information of a functional block in the semiconductor device 2. The functional block is a circuit fulfilling a corresponding function and includes one or a plurality of elements 3. On the other hand, a logical block refers to one or a plurality of elements 3 performing individual logical computation. The functional block information I3 may include information defining an outer shape of the functional block in the semiconductor device 2 and positional information of the functional block in the semiconductor device 2. The functional block information I3 may include connection information of the terminals included in the part shape information I1, FIG. 2C illustrates an example of a functional block 4. FIG. 2C illustrates a functional block 4a computing AND (logical product) and a functional block 4b computing OR (logical sum). Since the functional block information I3 includes the positional information in the semiconductor device 2, it is possible to specify at which position in the semiconductor device 2 each functional block 4 is arranged due to the functional block information I3.

The simulation data 1 in FIG. 1 can be stored in one file (hereinbelow referred to as an integrated file in some cases). This file is generated in a format that can be interpreted and executed by a computer. The file may also be made downloadable from a particular website, for example. The downloaded file can be interpreted and executed by a downloading computer. The computer executes the simulation data in the integrated file to enable a circuit to be generated and enable an operation examination (simulation) of the generated circuit to be performed. The simulation may be performed by inputting the integrated file into a dedicated simulator instead of the computer. In the present specification, a computer or the like that interprets and executes the integrated file is collectively referred to as a computing device.

Figure 3A:
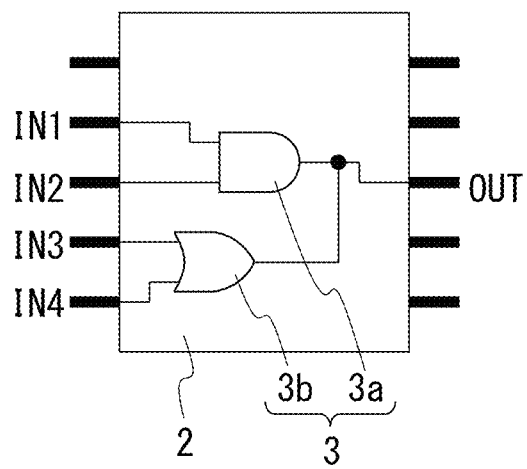
FIG. 3A schematically illustrates an element in the semiconductor device generated based on an integrated file.
Figure 3B:
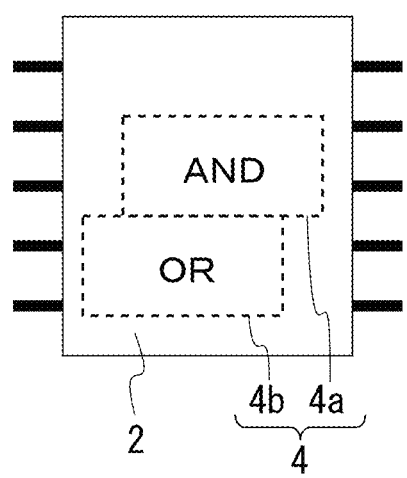
FIG. 3B schematically illustrates a functional block in the semiconductor device generated based on the integrated file.

FIGS. 3A and 3B schematically illustrate a circuit in the semiconductor device 2 generated based on the integrated file. FIG. 3A illustrates an example in which the semiconductor device 2 includes input terminals IN1 to IN4, a power supply terminal VDD, a ground terminal GND1, a ground terminal GND2, and an output terminal OUT. Among these, the input terminals IN1 and IN2 are connected to an AND gate, the input terminals IN3 and IN4 are connected to an OR gate, and output terminals of the AND gate and the OR gate are connected to the output terminal OUT of the semiconductor device 2. FIG. 3B schematically illustrates positional information of the functional block 4 included in the integrated file. FIG. 3B illustrates an example in which the functional block 4a corresponding to the AND gate is arranged slightly further on the upper left side than the center of the semiconductor device 2, and in which the functional block 4b corresponding to the OR gate is arranged slightly further on the lower right side than the center of the semiconductor device 2. In this manner, by executing the integrated file on the computer or the simulator, the circuit and the layout illustrated in FIGS. 3A and 3B can be generated.

FIG. 4 illustrates a specific example of the simulation data 1, which is the content of the integrated file corresponding to FIG. 3. The simulation data 1 in FIG. 4 includes the part shape information I1, the logical model information I2, the functional block information I3, and correspondence information I4 between the functional blocks and the logical blocks. The simulation data 1 in FIG. 4 illustrates a description example of the circuit in the semiconductor device 2 illustrated in FIGS. 3A and 3B. The simulation data 1 in FIG. 4 is text information composed of ASCII code and includes the part shape information I1, the logical model information I2, the functional block information I3, and the correspondence information I4 between the functional blocks and the logical blocks. In the example in FIG. 4, although the part shape information I1, the logical model information I2, the functional block information I3, and the correspondence information I4 are described in this order, the order in which the respective pieces of information are described is arbitrary.

The part shape information I1 in FIG. 4 includes a line group Ln1 describing coordinates of the outer shape of the part and a line group Ln2 describing identification IDs "1" to "5" and coordinates of terminals T1 to T5 of the part. As illustrated in FIG. 4, each of the terminals T1 to T5 of the part has a predetermined length and width, and the line group Ln2 describes the center coordinates of the region of each of the terminals T1 to T5.

The logical model information I2 in FIG. 4 includes a line group Ln3 describing connection information and terminal information of the element 3 in the semiconductor device 2 in order. A first line of the logical model information I2 refers to an external file "LOGIC.vhd" describing connection information of an AND gate 3a. In second and subsequent lines, correspondence information and the like between the terminal information for the AND gate 3a included in the part shape information I1 and the terminal information in the external file are described. Similarly, connection information of an OR gate 3b is described in the logical model information I2.

The functional block information I3 in FIG. 4 includes a line group Ln4 describing coordinate positions of the two functional blocks 4 illustrated in FIG. 3B and a line group Ln5 describing names and center coordinates of the respective functional blocks 4. In the line group Ln5, positional information of the functional blocks is described to correspond to the terminal information included in the part shape information.

In a line group Ln6 describing the correspondence information between the functional blocks 4 and the logical blocks in FIG. 4, a first line refers to the external file "LOGIC.vhd" describing the connection information of the logical model in a similar manner to the logical model information I2. Also, in second and subsequent lines, the correspondence information between the logical blocks and the functional blocks 4 is described.

The integrated file containing the simulation data 1 illustrated in FIG. 4 may be stored in a not-illustrated storage unit as necessary. The simulation data 1 illustrated in FIG. 4 is read by a computing device 10 such as a simulator, the content of the integrated file is interpreted, and a simulation is executed.

Figure 5:
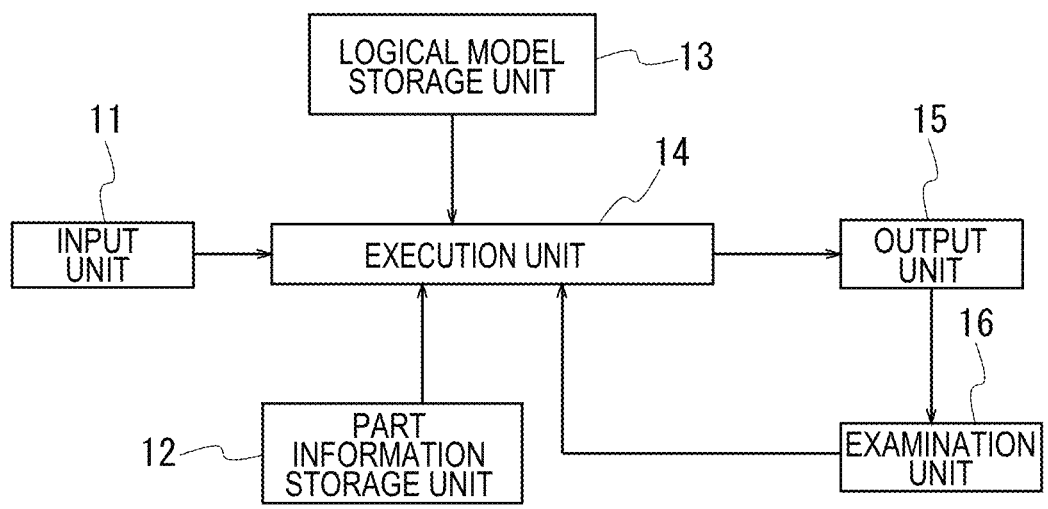
FIG. 5 is a block diagram illustrating an example of an internal configuration of a computing device.

FIG. 5 is a block diagram illustrating an example of an internal configuration of a computing device 10. The computing device 10 in FIG. 5 includes an input unit 11, a part information storage unit 12, a logical model storage unit 13, an execution unit 14, an output unit 15, and an examination unit 16. The computing device 10 in FIG. 5 executes a simulation of the semiconductor device 2. The computing device 10 uses the simulation data 1 to cause the part shape information I1, the logical model information I2, and the functional block information I3 to correspond to each other to execute the simulation of the semiconductor device 2.

The input unit 11 inputs the integrated file illustrated in FIG. 3. An operator may input the integrated file illustrated in FIG. 3 with use of a keyboard or the like. Alternatively, the operator may electronically retrieve the integrated file from an electric device having a communication function via the input unit 11.

The part information storage unit 12 stores various kinds of part information. The part information is information about the outer shape, size, number of terminals, terminal position, and the like of the part, as illustrated in FIG. 2A.

The logical model storage unit 13 stores the external file described in the logical model information I2 in the simulation data 1. Meanwhile, in a case in which the connection information and the operation of the logical model are directly described in the logical model information I2 without reference to the external file, the logical model storage unit 13 may not be provided.

The execution unit 14 reads and interprets the part shape information I1, the logical model information I2, and the functional block information I3 described in the input integrated file, generates a simulation target circuit based on the part shape information I1, the logical model information I2, and the functional block information I3, and executes a simulation based on the generated circuit.

As will be described below, there are a plurality of simulations that the execution unit 14 is to execute such as a circuit simulation, an electromagnetic field simulation, and a temperature simulation. Although the present specification illustrates an example in which the single execution unit 14 performs a plurality of simulations, a plurality of computing devices 10 (simulators) may perform different simulations, respectively. Alternatively, a plurality of execution units 14 may be provided in one computing device 10, and the respective execution units 14 may perform different simulations.

The output unit 15 outputs a simulation result executed by the execution unit 14. The output format of the simulation result is arbitrary.

The examination unit 16 examines whether or not the circuit generated based on the integrated file or the layout is valid based on the simulation result output from the output unit 15, and if not, changes the circuit or the layout.

Figure 6:
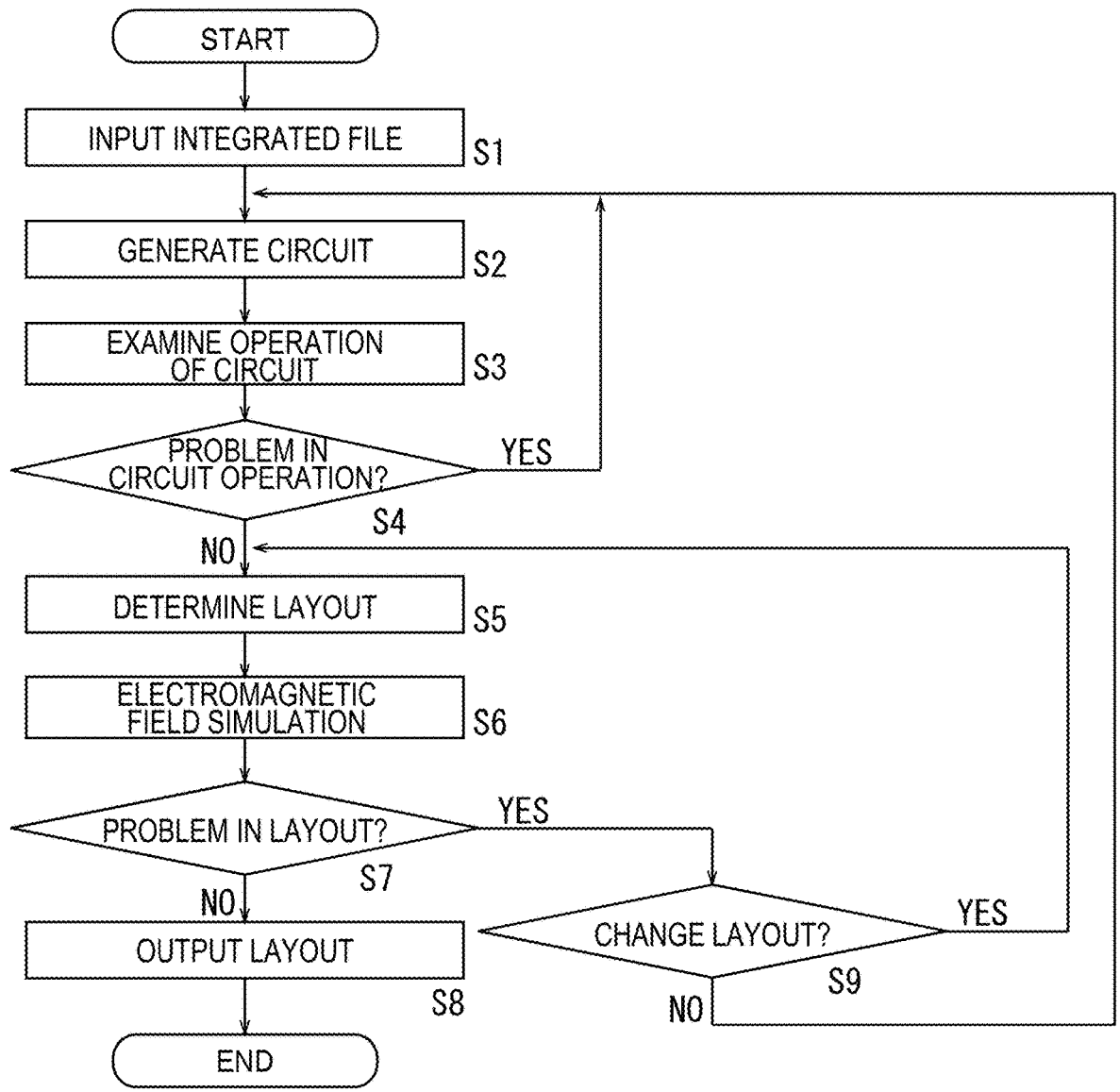
FIG. 6 is a flowchart illustrating an example of a processing operation of the computing device.

FIG. 6 is a flowchart illustrating an example of a processing operation of the computing device 10. First, the integrated file is input via the input unit 11 (step S1). Subsequently, the execution unit 14 reads and interprets the integrated file and generates the simulation target circuit based on the part shape information IL the logical model information I2, and the functional block information I3 (step S2). The generated simulation target circuit is output from the output unit 15.

Subsequently, the execution unit 14 and the examination unit 16 use the circuit simulator to examine the operation of the simulation target circuit (step S3). Subsequently, the examination unit 16 determines whether or not there is a problem in the operation of the simulation target circuit based on a simulation result of the circuit simulator (step S4). In a case in which there is a problem in the operation, the processing in step S2 and subsequent steps is repeated. Meanwhile, depending on the case, a new integrated file may be input again when it is determined in step S4 that there is a problem. In this case, the processing in step S1 and subsequent steps is repeated. For example, the examination unit 16 examines at least either heat or noise generated in the simulation target circuit during execution of the simulation of the simulation target circuit.

In a case in which it is determined in step S4 that there is no problem in the operation, the layout is determined based on the simulation target circuit whose operation has been examined (step S5). Although the computing device 10 according to the present embodiment can determine the layout, the processing in step S5 and subsequent steps may be performed by another computing device 10 or the like. Alternatively, the computing device 10 according to the present embodiment may request another device that performs the layout determination to perform the layout determination processing, receive the layout determination result, and perform the processing in step S5 and subsequent steps.

Subsequently, the computing device 10 performs an electromagnetic field simulation based on the layout determination result (step S6). Subsequently, it is determined whether or not a result of the electromagnetic field simulation has a problem (step S7). For example, in a case in which it is determined in the electromagnetic field simulation that an electro magnetic interference (EMI) noise generated from a part of the layout region of the semiconductor device exceeds a predetermined threshold value, it is determined that there is a problem.

In a case in which it is determined in step S7 that there is a problem, it is determined whether or not to change the layout (step S8). In a case in which it is determined that the layout is to be changed, the processing in step S5 and subsequent steps is repeated. On the other hand, in a case in which it is determined that the problem in step S7 cannot be solved by, for example, changing the layout, the processing in step S2 and subsequent steps is repeated.

In a case in which it is determined in step S7 that there is no problem, the layout determination result in step S5 is output via the output unit 15 (step S9).

In the present embodiment, since the simulation is executed in a state in which the positional information of the functional block 4 corresponding to the logical model in the semiconductor device 2 is designated, noise distribution and temperature distribution in the semiconductor device 2 can be examined accurately.

Figure 7A:
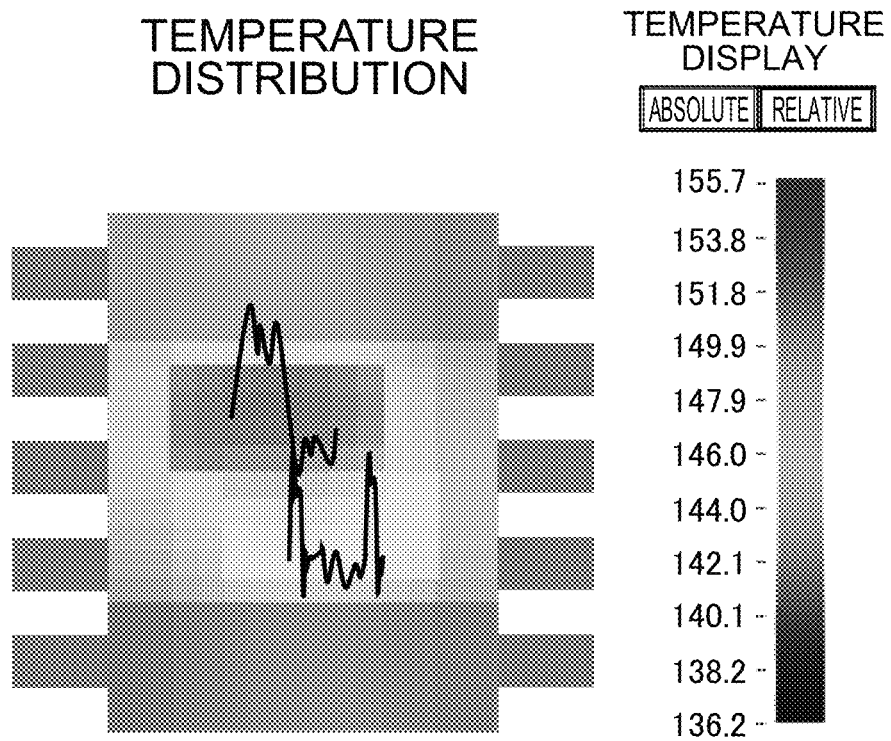
FIG. 7A schematically illustrates a result of a heat simulation according to the present embodiment.
Figure 7B:
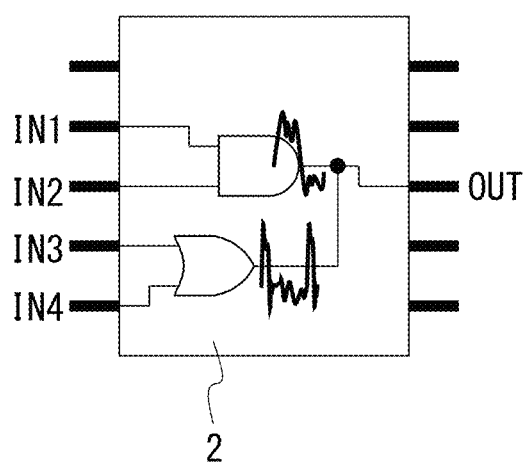
FIG. 7B schematically illustrates an output signal waveform of the element corresponding to the functional block in the semiconductor device.

FIG. 7A schematically illustrates a result of a heat simulation according to the present embodiment. FIG. 7B schematically illustrates an output signal waveform of the element 3 corresponding to the functional block 4 in the semiconductor device 2. The more significantly the output signal of the element 3 fluctuates, the more easily heat is generated. In the present embodiment, each element 3 in the semiconductor device 2 is caused to correspond to any one of the functional blocks 4, and the positional information of the respective functional blocks 4 in the semiconductor device 2 is designated in advance. Hence, by figuring out by means of the circuit simulation the output signal waveform generated when each element 3 is operated, the heat generation state of the corresponding functional block 4 can be estimated, and the temperature distribution in the semiconductor circuit can be estimated accurately.

The same applies to noise. The more the output signal waveform of the element 3 fluctuates, the more easily noise is generated. Therefore, the noise generation state can be estimated for each position of the functional block 4 corresponding to each element 3, and the noise distribution in the semiconductor device 2 can be estimated accurately.

Conventionally, a simulation is performed by setting a specific excitation source and power source in the semiconductor device 2. Even in a case in which the specific excitation source and power source are set, temporary heat and noise generated at the time of actual operation of the semiconductor device 2 cannot be taken into consideration. Therefore, the temperature distribution and the noise distribution in the semiconductor device 2 cannot be estimated accurately. Also, conventionally, since there is no idea of performing the simulation in a state of allocating each element 3 in the semiconductor device 2 to any one of the functional blocks 4 and designating the positional information of the functional blocks 4 in advance, an influence of heat and noise generated locally in the semiconductor device 2 depending of the operation state of the semiconductor device 2 cannot be figured out.

In the present embodiment, each element 3 in the semiconductor device 2 is caused to correspond to any one of the functional blocks 4, and the positional information of the respective functional blocks 4 in the semiconductor device 2 is designated in advance. Hence, by examining the output signal waveform of each element 3 in the semiconductor device 2 by means of the circuit simulation, it is possible to accurately estimate how much heat and noise is generated at which position in the semiconductor device 2. As described above, in the present embodiment, heat and noise generated in the semiconductor device 2 can be examined accurately under operation conditions close to those in a case in which the semiconductor device 2 is actually operated.

The aforementioned simulation data 1 in FIG. 1 may be data in the form of a program executable by the computing device 10. That is, the simulation data 1 in FIG. 1 may be described in the form of a program in which the part shape information I1, the logical model information I2, and the functional block information I3 are respectively different parameters. More specifically, in this program, one or a plurality of functions executable by the computing device 10 may be described, and the part shape information I1, the logical model information I2, and the functional block information I3 may be given as arguments of these functions.

At least a part of the computing device 10 described in the above embodiment may be configured to act as hardware or software. In a case in which at least a part of the computing device 10 is configured to act as software, a program that fulfills the function of at least a part of the computing device 10 may be stored in a recording medium such as a flexible disk and a CD-ROM, read by a computer, and executed. The recording medium is not limited to a removable medium such as a magnetic disk and an optical disk, but may be a fixed recording medium such as a hard disk device and a memory.

Also, a program that fulfills the function of at least a part of the computing device 10 may be distributed via a communication line (including wireless communication) such as the Internet. Further, the program may be distributed in a state of being encrypted, modulated, or compressed via a line such as the Internet by cable or by radio or in a state of being stored in a recording medium.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A non-transitory readable recording medium comprising: simulation data input into a computing device executing a simulation of a semiconductor device,
   wherein the simulation data comprises
   part shape information describing an outer shape of the part and a size, number of terminals and terminal position information of the semiconductor device,
   logical model information describing operation and connection information of an element in the semiconductor device, and
   functional block information describing positional information of a functional block in the semiconductor device and information defining an outer shape of the function block, and
   the computing device causes the part shape information, the logical model information, and the functional block information to correspond to each other to execute the simulation of the semiconductor device.

2. The recording medium according to claim 1,
   wherein the positional information of the functional block is described to correspond to the terminal information included in the part shape information.

3. The recording medium according to claim 1,
   wherein the logical model information comprises connection information of a logical block in the semiconductor device, and
   the simulation data further comprises correspondence information between the logical block and the functional block.

4. The recording medium according to claim 3,
   wherein the logical model information comprises terminal information of the logical block described to correspond to the terminal information included in the part shape information.

5. The recording medium according to claim 1,
   wherein the logical model information comprises a file name of a file describing operation of the semiconductor device and information for reference to the file.

6. The recording medium according to claim 1,
   wherein the part shape information comprises information defining an outer shape of the semiconductor device.

7. The recording medium according to claim 6,
   wherein the part shape information comprises positional information of a corner of the semiconductor device.

8. The recording medium according to claim 1,
   wherein the part shape information comprises positional information of the terminal of the semiconductor device.

9. The recording medium according to claim 1,
   wherein the simulation data including the part shape information, the logical model information, and the functional block information are described in a format interpreted and executed by a computing device executing a simulation of a simulation target circuit.

10. A computing method comprising: inputting simulation data comprising part shape information describing an outer shape of the part and a size, number of terminals and terminal position information of a semiconductor device, logical model information describing operation and connection information of an element in the semiconductor device, and functional block information describing positional information of a functional block in the semiconductor device and information defining an outer shape of the function block, and
   causing the part shape information, the logical model information, and the functional block information to correspond to each other to execute a simulation of the semiconductor device.

11. The computing method according to claim 10, comprising:

generating a simulation target circuit based on the part shape information, the logical model information and the functional block information;
examining the simulation target circuit generated;
determining a layout of a part based on the simulation target circuit examined; and
examining the layout of the part.

12. The computing method according to claim 10, comprising:
examining at least either heat or noise generated in the semiconductor device during execution of the simulation of the semiconductor device.

13. An operating apparatus comprising:
an input unit inputting simulation data comprising part shape information describing an outer shape of the part and a size, number of terminals and terminal position information of a semiconductor device, logical model information describing operation and connection information of an element in the semiconductor device, and functional block information describing positional information of a functional block in the semiconductor device and information defining an outer shape of the function block, and
an execution unit causing the part shape information, the logical model information, and the functional block information to correspond to each other to execute a simulation of the semiconductor device.

14. The operating apparatus according to claim 13, further comprising processing circuitry configured to:

generate a simulation target circuit based on the part shape information, the logical model information and the functional block information;
examine the simulation target circuit generated;
determine a layout of a part based on the simulation target circuit examined; and
examine the layout of the part.

15. The operating apparatus according to claim 13, wherein the processing circuitry examines at least either heat or noise generated in the semiconductor device during execution of the simulation of the semiconductor device.

16. The operating apparatus according to claim 13, wherein the positional information of the functional block is described to correspond to the terminal information included in the part shape information.

17. The operating apparatus according to claim 13, wherein the logical model information comprises connection information of a logical block in the semiconductor device, and
the simulation data further comprises correspondence information between the logical block and the functional block.

18. The operating apparatus according to claim 13, wherein the logical model information comprises terminal information of the logical block described to correspond to the terminal information included in the part shape information.

* * * * *